FREQUENCY BAND SEPARATION IN TRANSLATING APPARATUS

Filed Feb. 9, 1959

INVENTORS
JOSEPH H. LANCOR
BY CLIFFORD E. BERRY
Christie, Parker & Hale
ATTORNEYS 3,061,684
Patented Oct. 30, 1962

3,061,684

FREQUENCY BAND SEPARATION IN TRANSLATING APPARATUS

Joseph H. Lancor, Pasadena, and Clifford E. Berry, Altadena, Calif., assignors, by mesne assignments, to Consolidated Electrodynamics Corporation, Pasadena, Calif., a corporation of California Filed Feb. 9, 1959, Ser. No. 791,973
6 Claims. (Cl. 325—26)

This invention relates to communication apparatus, and more particularly, is concerned with apparatus for dividing a wide frequency band signal into a plurality of separate relatively narrow low-frequency band signals.

In the electronics communications field it is sometimes necessary to record, amplify, transmit, or otherwise process signals covering a frequency bandwidth many times greater than the practical bandwidth capabilities of the signal processing equipment. Such a problem arises, for example, in transmitting video signals over telephone circuits which have a relatively narrow bandwidth capability. A similar problem arises in the recording of video signals on magnetic tape, since the bandwidth limitations of magnetic tape are such that the whole frequency spectrum of video signals may not be directly recorded on the tape.

The present invention provides apparatus by means of which a wide band signal can be divided into a plurality of separate narrow band signals which can be separately transmitted, recorded, or otherwise processed, without loss of the total information carried by the wide band signal. Thus for example, a wide band video signal could be recorded in a plurality of separate channels on magnetic tape, or transmitted over a plurality of limited bandwidth transmission paths.

In brief, the present invention provides apparatus for dividing a broad band signal into a plurality of separate narrow band channels, including frequency separating means for dividing the wide band signal into a lower band and an upper band. The upper band is heterodyned to a lower frequency, while the lower band provides a first output channel signal. The upper band after translation by the heterodyning means may again be split into a lower and upper band with a second channel output being derived from the lower band. The upper band again is heterodyned to translate its frequency downward and a third channel or a number of additional channels being derived in the same manner from the output of the heterodyning means.

For a more complete understanding of the invention, reference should be had to the accompanying drawing, wherein.

Figure 1:
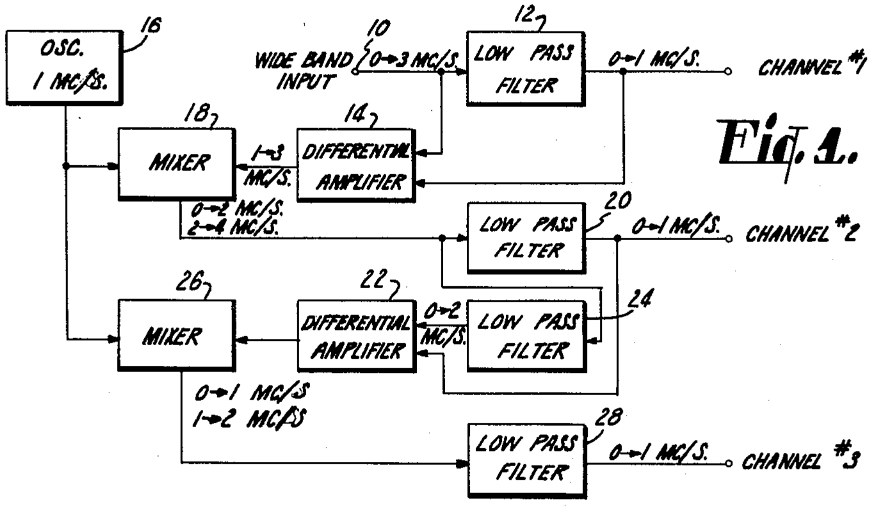
FIG. 1 is a block diagram of a system in which an input signal is divided into three output channels.

Referring to FIG. 1, there is shown an arrangement whereby an input signal, covering, for example, a band of from zero to three megacycles per second, is transmitted over three output channels, each of which is limited, for example, to a frequency band of zero to one megacycle per second. The frequency figures are given by way of example only and are not suggested in any limiting sense.

The wide band input signal applied to a terminal 10 is coupled to the input of a low pass filter 12. The upper cutoff frequency of the low pass filter 12 is designed to correspond to the bandwidth limitation of the transmission or other signal processing equipment being used. The output of the filter provides the first output channel, designated channel #1.

The wide band input signal to the low pass filter 12 is also connected to a differential amplifier 14 along with the low frequency band output of the filter 12. A differential amplifier serves as a subtraction circuit so that the output signal of the amplifier includes all portions of the spectrum not passed by the low pass filter 12. The action of the low pass filter 12 and differential amplifier 14 in splitting the frequency band of the input signal into an upper and lower part is described in detail in Patent No. 2,760,011. The effect is best appreciated by consideration of the curve shown in FIG. 2 in which the curve A shows the frequency band of the input signal, curve B shows the portion of the band passed by the low pass filter 12, and curve C shows the frequency characteristic of the output of the differential amplifier 14.

In the example given, the output of the low pass filter is zero to one megacycle per second as applied to the channel #1 output. The output of the differential amplifier 14 therefore includes signals having frequency components in the range of one to three megacycles per second, which is the upper portion of the wide band input not passed by the low pass filter 12.

The output of the differential amplifier 14 is heterodyned with the output of an oscillator 16 whose frequency corresponds to the upper cutoff frequency of the low pass filter 12. Thus in the example given, the oscillator has an output frequency of one megacycle per second. Heterodyning takes place in a conventional mixer or converter circuit 18 by which the output of the oscillator 16 is beat with the output of the differential amplifier 14. As a result of the heterodyning action, the output of the mixer 18 includes upper and lower sidebands corresponding to the difference frequency components and the sum frequency components. In the example given, the lower sideband would include the frequency components from zero to two megacycles per second and the upper sideband would include the frequency components of two to four megacycles per second.

The output of the mixer 18 is applied to a second lowpass filter 20 identical to the filter 12. The output of the filter 20 provides a channel #2 output having a frequency band of from zero to one megacycle per second.

From the description thus far it will be appreciated that the lower frequency band from the output of the mixer 18 contains any information in the way of amplitude variations corresponding to the one to three megacycle per second components of the wide band input. The mixer 18 contains no signal components corresponding to the zero to one megacycle portion of the wide band input which is applied to channel #1. Thus the output of the lowpass filter 20 as applied to channel #2 corresponds to the one to two megacycle per second portion of the wide band input which has been translated down to the zero to one megacycle region of the spectrum, as shown by curve E of FIG. 2.

The balance of the wide band input signal can be derived at a third channel in substantially the same way. Thus the input and output of the lowpass filter 20 are both applied to a differential amplifier 22. However, since the input to the lowpass filter 20 includes the upper sideband frequency components from the mixer 18 it is desirable to include a lowpass filter 24 to limit the signal applied to the differential amplifier to the lower sideband frequency component from the mixer 18. The filter 24 therefore has an upper cutoff frequency substantially double that of the filters 12 and 20. Thus in the example given, the output from the differential amplifier 22 includes signals having components in the frequency band of one to two megacycles per second. These components correspond to the components of the wideband input signal in the region from the two to three megacycle per second portion of the input.

The differential amplifier is applied to a mixer 26 together with the output of the oscillator 16. The output of the mixer 26 includes a lower sideband of from zero to one megacycle per second and an upper sideband of from two to three megacycles per second. A lowpass filter 28 coupled to the output of the mixer 26 passes only the lower sideband components, the output of the lowpass filter 28 forming channel #3.

Thus it will be appreciated that the circuit of FIG. 1 provides three outputs, each of which includes signals in the zero to one megacycle range, the information in the three channels corresponding respectively to the three separate portions of the wideband input signal. The three output channels together contain all the information of the original wideband signal but each may operate into a device having a bandwidth limitation of only a third that of the input signal.

The arrangement described in FIG. 1 can be used for dividing the input signal into two or three channels. However, where it is desired to divide the input signal into more than three channels, overlapping in the upper and lower sideband components from the mixers produces spurious modulation products. This limitation may be overcome by the arrangement shown in FIG. 3. This particular circuit splits the input signal into four channels, but the principles involved can be used to split the input signal into any number of channels desired.

The technique described above is used in the circuit of FIG. 3 to split the input signal into effectively two intermediate channels. This is accomplished by applying the input signal to a lowpass filter 30, the input and output of the filter 30 being applied to a differential amplifier 32. In this case the lowpass filter 30 has a cutoff frequency at the midpoint of the input band. Thus the lower half of the input band is passed by the output of the lowpass filter 30. The upper half of the input band is provided at the output of the differential amplifier 32 and is applied to a mixer 34 to which is also applied the output of an oscillator 36. As in the circuit of FIG. 1, the oscillator frequency is the same as the upper cutoff frequency of the lowpass filter 30.

The lower and upper sidebands produced by the output of the mixer 34 are applied to a lowpass filter 38, the output of which comprises a second intermediate channel. It will be appreciated from the previous description of the operation of the circuit of FIG. 1 that the outputs of the filters 30 and 38 respectively comprise the lower half and the upper half of the frequency spectrum of the input signal.

Each of the intermediate channels is again split in two to provide the desired four output channels. To this end the output of the lowpass filter 30 is applied to a lowpass filter 40 which has an upper cutoff frequency of half that of the filters 30 and 38. Thus the output of the lowpass filter 40 provides a first channel output having a bandwidth of zero to one megacycle per second and corresponding to the portion of the input signal included in the lower fourth of the input frequency spectrum.

Again the input and output of the lowpass filter 40 are respectively applied to a differential amplifier 42 by which the upper half of the intermediate band of zero to two megacycles per second is applied to a mixer 44. Heterodyning takes place with a signal whose frequency corresponds to the upper cutoff frequency of the lowpass filter 40, which signal may be derived from the oscillator 36 through a frequency divider circuit 46. The second output channel is derived from the mixer 44 through a lowpass filter 48.

The upper intermediate band from the lowpass filter 38 is similarly split between a third output channel and a fourth output channel by means of a lowpass filter 50 identical to the filter 40. The input and output of the filter 50 are applied to a differential amplifier 52, the output of which is heterodyned with the output of the frequency divider 46 in a mixer circuit 54. The output of the mixer forms the fourth channel output through a lowpass filter 56 which is identical to the lowpass filter 50.

Figures 2, 3:
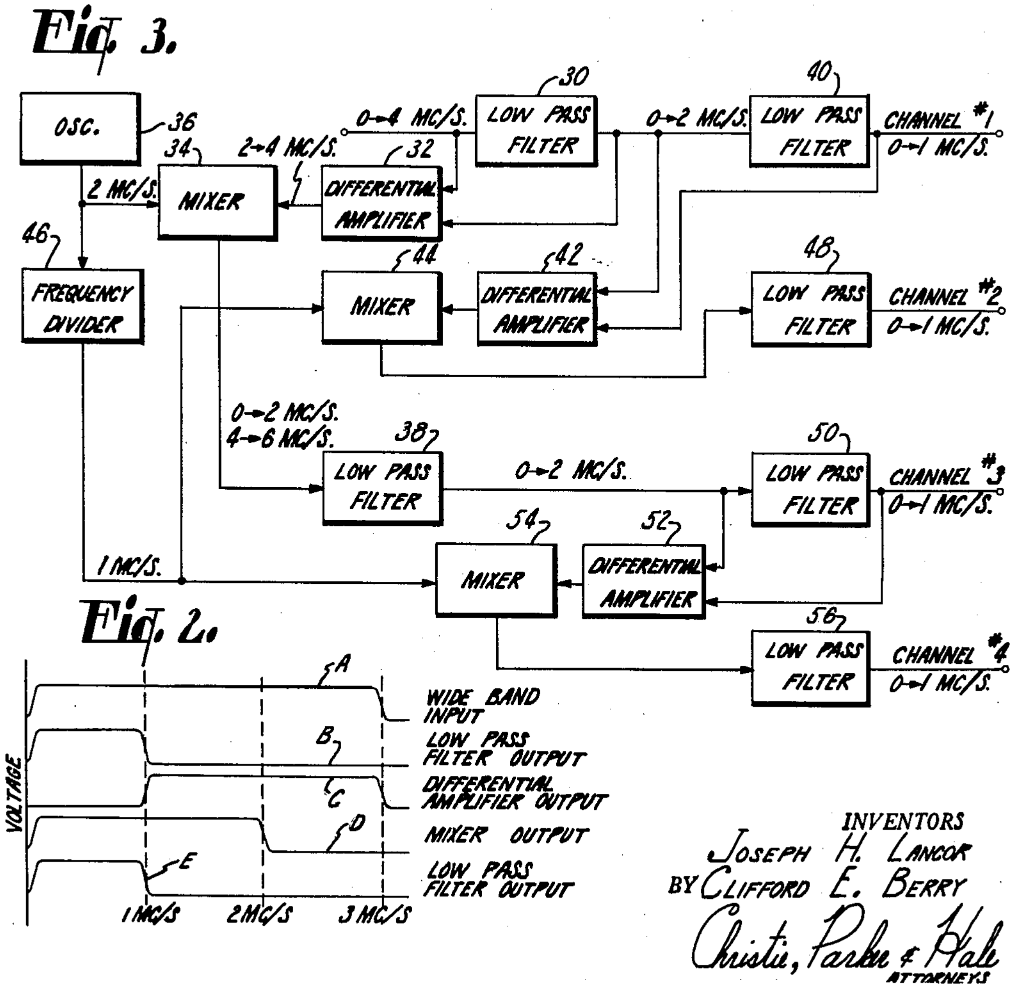
FIG. 2 is a series of wave forms used in explaining the operation of FIG. 1.
FIG. 3 is a block diagram of a modified system in which the input signal is divided into four channels.

Thus in the arrangement of FIG. 3, the input signal is divided into four output channels which together contain all the information of the original wideband signal. Splitting of frequency spectrum at the midpoint by this means can be repeated as many times as desired to provide eight, sixteen, etc., to as many channels as may be desired. By limiting the splitting of the spectrum into two parts at each stage, there is no problem of overlapping of frequencies of upper and lower sideband components from the mixers due to the heterodyning action.

What is claimed is:

1. Apparatus for dividing a broad band signal into a plurality of separate narrow band channels comprising a local oscillator, a first lowpass filter coupling the broad band signal to a first one of the narrow band channels, a first differential amplifier having a pair of inputs connected respectively to the input and output of the lowpass filter, a mixer coupled to the ouput of the oscillator and the differential amplifier, and a second lowpass filter coupling the output of the mixer to a second one of the narrow band channels.

2. Apparatus for dividing a broad band signal into a plurality of separate narrow band channels comprising a local oscillator, a first lowpass filter coupling the broad band signal to a first one of the narrow band channels, subtracting means having a pair of inputs connected respectively to the input and output of the lowpass filter, a mixer coupled to the output of the oscillator and the subtracting means, and a second lowpass filter coupling the output of the mixer to a second one of the narrow band channels.

3. Apparatus as defined in claim 2 wherein the oscillator has a frequency substantially equal to the cutoff frequency of the lowpass filters.

4. Apparatus as defined in claim 2 further including second subtracting means having a pair of inputs connected respectively to the input and the output of the second lowpass filter, a second mixer connected to the oscillator and the output of the second subtracting means, and a third lowpass filter coupling the output of the second mixer to a third one of the narrow band channels.

5. Apparatus as defined in claim 4 further including a fourth lowpass filter coupling the second subtracting means to the input side of said second lowpass filter, the fourth lowpass filter having a cutoff frequency substantially double that of the other lowpass filters for cutting out upper side-band frequencies generated by the mixer.

6. Apparatus for dividing a wide frequency band signal into a plurality of narrow low frequency band output signals, comprising means for splitting the wide band signal into a lower band signal and an upper band signal, heterodyning means for translating the upper band signal downward in frequency by an amount equal to the cutoff frequency of the lower band, means for deriving a first output signal from the lower band signal, means for deriving a second output signal from the output of the heterodyning means, and said means for deriving the first output signal including means for splitting said lower band signal again into a lower band and an upper band, heterodyning means for translating the resulting upper band signal downward in frequency by an amount equal to the cutoff frequency of the resulting lower band, the first output signal being derived from the resulting lower band, and means for deriving a third output signal from the output of the last-mentioned translating means.

References Cited in the file of this patent

UNITED STATES PATENTS

| | | |
|---|---|---|
| 2,635,140 | Dome | Apr. 14, 1953 |
| 2,686,831 | Dome | Aug. 17, 1954 |
| 2,874,221 | Dauguet | Feb. 17, 1959 |